(12) United States Patent
Mahajan et al.

(10) Patent No.: US 9,256,489 B2
(45) Date of Patent: Feb. 9, 2016

(54) SYNCHRONIZED DEBUG INFORMATION GENERATION

(71) Applicant: International Business Machines Corporation, Armonk, NY (US)

(72) Inventors: Ajay K. Mahajan, Austin, TX (US); Venkatesh Sainath, Bangalore (IN); Vishwanatha Subbanna, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 155 days.

(21) Appl. No.: 14/066,722

(22) Filed: Oct. 30, 2013

(65) Prior Publication Data

US 2015/0121144 A1    Apr. 30, 2015

(51) Int. Cl.
*G06F 11/07* (2006.01)

(52) U.S. Cl.
CPC .......... *G06F 11/079* (2013.01); *G06F 11/0745* (2013.01); *G06F 11/0778* (2013.01)

(58) Field of Classification Search
CPC . G06F 11/079; G06F 11/106; G06F 11/0745; G06F 11/0778; G06F 13/1684; H04L 45/28; H04L 45/22; H04L 45/24
See application file for complete search history.

(56) References Cited

U.S. PATENT DOCUMENTS

| | | | |
|---|---|---|---|
| 6,760,868 B2 * | 7/2004 | Drogichen et al. | 714/41 |
| 6,857,084 B1 | 2/2005 | Giles | |
| 7,454,657 B2 * | 11/2008 | Duron et al. | 714/30 |
| 7,669,084 B2 * | 2/2010 | Duron et al. | 714/30 |
| 7,743,274 B2 | 6/2010 | Langford et al. | |
| 7,788,520 B2 * | 8/2010 | Langford et al. | 714/3 |
| 7,962,793 B2 * | 6/2011 | Duron et al. | 714/30 |
| 2009/0077412 A1 * | 3/2009 | Langford et al. | 714/4 |
| 2010/0083250 A1 * | 4/2010 | Nakai | 718/1 |
| 2011/0252272 A1 | 10/2011 | Goodwin et al. | |
| 2011/0276822 A1 | 11/2011 | Abdul et al. | |

OTHER PUBLICATIONS

IBM et al., "Failover to a redundant controller during controller recovery", pp. 1-2, an IP.com Prior Art Database Technical Disclosure, Jul. 14, 2008, IPCOM000172777D, <http://ip.com/IPCOM/000172777>.

* cited by examiner

*Primary Examiner* — Nadeem Iqbal
(74) *Attorney, Agent, or Firm* — Maeve McCarthy (57) ABSTRACT

In an approach for determining a location of failure between interconnects/controller, a computer collects debug information simultaneously at a plurality of nodes coupled to an interconnect. Subsequent to collecting debug information, the computer analyzes the debug information collected simultaneously thereby determining which end of the interconnect caused the failure.

13 Claims, 4 Drawing Sheets

FIG. 2

SCENARIO 1
- NC 116a AND NC 116b ARE FUNCTIONING CORRECTLY
- NC 122a AND NC 122b ARE FUNCTIONING CORRECTLY
- INTERCONNECT BETWEEN NODE 104 AND NODE 106 FAILS
⇒ SC 112 ALERTS NC 116a, NC 116b, NC 122a, NC 122b, AND REQUESTS DUMP

SCENARIO 2
- NC 116a AND NC 116b ARE FUNCTIONING CORRECTLY
- NC 122a IS FUNCTIONING CORRECTLY, NC 122b FAILS
⇒ SC 112 ALERTS NC 122a, NC 122b, SC 114, AND REQUESTS DUMP

SCENARIO 3
- NC 116a IS FUNCTIONING CORRECTLY, NC 116b FAILS
- NC 122a AND NC 122b ARE FUNCTIONING CORRECTLY
⇒ SC 112 ALERTS NC 116a, NC 116b, SC 114, AND REQUESTS DUMP

SYNCHRONIZED DEBUG INFORMATION GENERATION

FIELD OF THE INVENTION

The present disclosure relates to distributed computer systems, and more specifically to failure data for distributed computer systems.

BACKGROUND OF THE INVENTION

A combination of hardware and software components in computer systems today has progressed to a point such that these computer systems can be highly reliable. Reliability in computer systems may be provided by using redundant components. In some computer systems, for example, components such as node controllers that manage hardware error requests that nodes of the computer system are provided in redundant pairs—one primary node controller and one redundant (backup) node controller. When such a primary node controller fails, the redundant node controller takes over the primary node controller's operations. Redundant pairs can also be used for system controllers for the same purpose. Node controllers and system controllers may also be referred to as service processors. A service processor is the component in a distributed computer system that provides operation tasks such as initialization, configuration, run-time error detection, diagnostics and correction, as well as closely monitoring other hardware components for failures.

A system dump is the recorded state of the working memory of a redundant node controller at a specific time, such as when a program running on the redundant node controller has determined a loss of communications with the system controller. First failure data capture (FFDC) is a minimum set of information related to a certain error detected by a node and/or system controller. Debug dump data is a superset of FFDC, and it includes all information from the controller, including information that may not be directly relevant to the specific error investigation. When an error occurs in one of the nodes, the dump of debug information is captured immediately from the primary node controller for further analysis. However, the backup node controller may become aware of the error only if the primary fails and consequently the backup takes over as primary. This process is called failover. Waiting for the failover process to be completed to capture the dump may delay the dump of the debug information and negatively impact the ability to analyze the error.

SUMMARY

Embodiments of the present invention disclose a method, computer program product, and system for determining a location of failure between interconnects/controller. The method includes a computer collecting debug information simultaneously at a plurality of nodes coupled to an interconnect. Subsequent to collecting debug information, the computer analyzes the debug information collected simultaneously thereby determining which end of the interconnect caused the failure.

DETAILED DESCRIPTION

During normal operation within a distributed computer system, a particular node controller may detect an error. That error may include many different types of failures, such as communication failure errors, application or process failure errors, crashes or locking up of a particular node or node controller operation, as well as other errors. When a node controller detects an error in a distributed computer system, resources of the distributed computer system attempt to store error information relevant to that error for later retrieval. The distributed computer system monitors processes, applications, and other resources with a high priority on keeping those resources available to the user and other entities at all times. The distributed computer system may employ one or more system controllers that monitor operations of the node controllers and other devices of the distributed computer system and manage node controller error information. When a node controller detects an error, that error may cause communication failures within the distributed computer system. Communication failures may present a challenge to system controllers in retrieving node controller error detection information.

In system architectures with multiple service processors configured in a hierarchical architecture, collecting debug information simultaneously from more than one service processors upon encountering any error condition may improve error analysis. For example, if an intra-node interconnect experiences a failure, there is not a reliable method to determine which end of the interconnect is the cause of failure. Collecting debug information from service processors on both of the nodes between which the interconnect failure was seen, at the same time, provides additional data for error analysis. Another example of a failure that may benefit from collecting simultaneous debug information is when a node controller fails. When this occurs, the primary system controller can not communicate with the failed node controller. Gathering failure data simultaneously from both the backup system controller and the backup node controller in the node that experienced the failure may be beneficial. Yet another example of a failure that may benefit from collecting simultaneous debug information is when a primary node controller has difficulty accessing hardware within the node. At that time, failure data collected from both primary and backup node controllers simultaneously may give the system administrator additional insight into the error.

Embodiments of the present invention recognize analysis of errors within a distributed computer system can be improved if the first failure data capture (FFDC) and debug dump data are captured from all of the involved service processors, i.e. node controllers and system controllers, simultaneously. Embodiments of the present invention detect an error in a distributed computer system, determine from which service processors the debug information is collected, and aggregate the data into a single report. Implementation of embodiments of the invention may take a variety of forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable storage medium(s) having computer readable program code/instructions embodied thereon.

Any combination of computer-readable storage media may be utilized. A computer-readable storage medium may be, for example, but not limited to, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer, other programmable data processing apparatus, or other devices to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
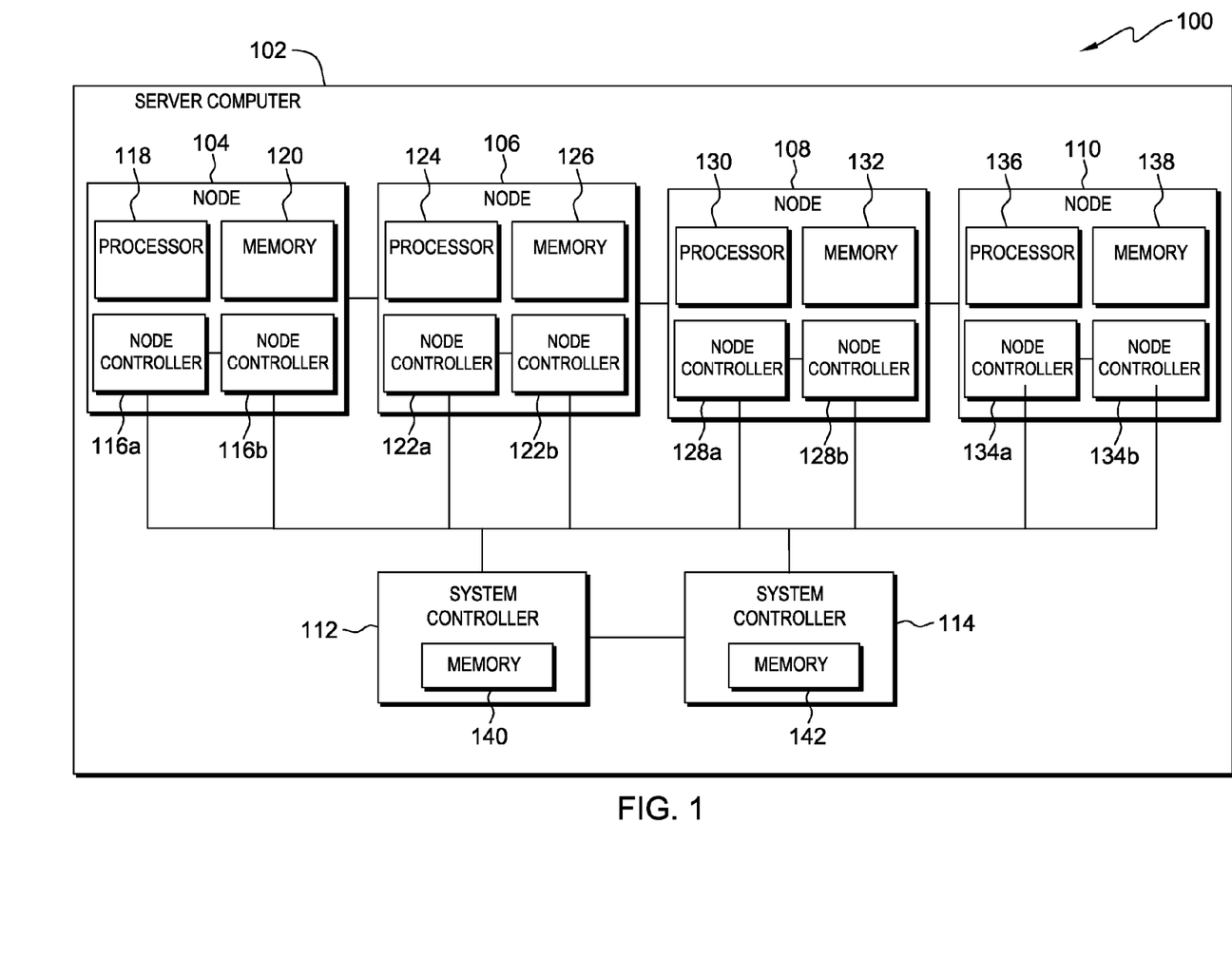
FIG. 1 is a functional block diagram illustrating a distributed computer system environment, including a server computer, in accordance with an embodiment of the present invention.

The present invention will now be described in detail with reference to the Figures. FIG. 1 is a functional block diagram illustrating a distributed computer system environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made.

Distributed computer system environment 100 includes server computer 102. Server computer 102 may be a management server, a web server, or any other electronic device or computing system capable of receiving and sending data. In other embodiments, server computer 102 may represent a server computing system utilizing multiple computers as a server system, such as in a cloud computing environment. In another embodiment, server computer 102 may be a laptop computer, tablet computer, netbook computer, personal computer (PC), a desktop computer, a personal digital assistant (PDA), a smart phone, or any programmable electronic device capable of communicating with other electronic devices. In another embodiment, server computer 102 represents a computing system utilizing clustered computers and components to act as a single pool of seamless resources. Server computer 102 includes nodes 104, 106, 108 and 110, as well as system controller 112 and system controller 114. Server computer 102 may include internal and external hardware components, as depicted and described in further detail with respect to FIG. 4.

Each of nodes 104 through 110 is a processing device that executes user applications and is contained in server computer 102. Each such node may be a web server, a database, or any other computing device. The embodiment illustrated in FIG. 1 depicts each node containing a processor (e.g. processor 118 of node 104, etc.), memory (e.g. memory 120 of node 104, etc.), and two node controllers (e.g. node controllers 116a and 116b of node 104, etc.). Each node controller can be a type of service processor. Although not all shown in FIG. 1, nodes may include any number of devices such as additional computer processors, additional computer memory, disk drive adapters, disk drives, communication adapters, bus adapters, and so on as will occur to those of skill in the art. As depicted in FIG. 1, server computer 102 is configured with four nodes (104, 106, 108, 110), but readers of skill in the art will recognize that computer systems useful in administering a system dump on a redundant node controller of a computer according to embodiments of the present invention may include any number of nodes. In various embodiments of the present invention, for example, a computer system may include from one to eight nodes.

Each node (104, 106, 108, 110) in server computer 102 includes two node controllers configured in a redundant relationship, capable of taking over certain responsibilities from one another. A node controller is a device contained in a node that attends to any hardware error requests of the node that occur during operation of the computer system. A pair of node controllers in a node provides, as a group, reliable node controller operations due to redundancy—when one node controller fails, the redundant node controller takes over node controller operations for the node of the computer system. Only one node controller in a pair is configured as a primary node controller at one time. The primary node controller is the node controller in which all node controller operations are carried out for a node of the computer system. A redundant node controller, in contrast, carries out no node controller operations for the node of the computer system until the primary node controller fails. For example, in the context of server computer 102, in node 104, node controller 116a is the primary node controller and node controller 116b is the backup node controller. In node 106, node controller 122a is the primary node controller and node controller 122b is the backup node controller. In node 108, node controller 128a is the primary node controller and node controller 128b is the backup node controller. In node 110, node controller 134a is the primary node controller and node controller 134b is the backup node controller.

Server computer 102 includes two system controllers (112, 114). Each system controller can be a type of service processor. A system controller is a controller that manages nodes in a computer system. System controllers may collect error and operational status information from nodes during the operation of the computer system as well as direct operations of the nodes. In an embodiment of the present invention, server computer 102 includes a redundant system controller to provide reliability. In particular, in server computer 102, system controller 112 is the primary system controller and system controller 114 is the backup system controller.

Each system controller includes nonvolatile memory storage (140, 142), such as a hard disk drive, CD drive, DVD drive or other nonvolatile storage. Nonvolatile memory storage is used to aggregate all debug information generated during a failure situation, as discussed in detail below.

Figure 2:
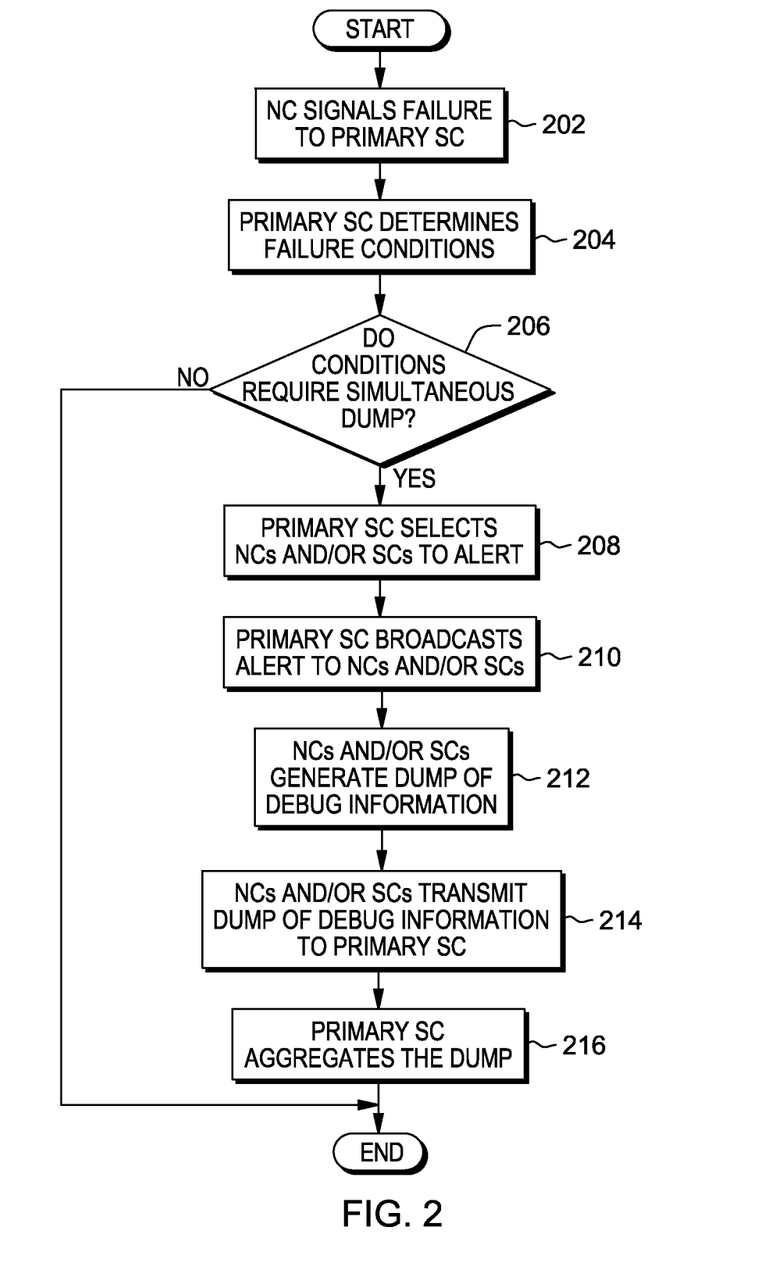
FIG. 2 is a data flow diagram depicting the intercommunications of components within the distributed computer system environment of FIG. 1, for synchronizing debug information generation, in accordance with an embodiment of the present invention.

FIG. 2 is a data flow diagram depicting the intercommunications of components within the distributed computer system environment of FIG. 1, for synchronizing debug information generation, in accordance with an embodiment of the present invention.

Upon detecting an error, a service processor, such as a node controller or another system controller, signals the primary system controller that a failure has occurred (step 202). In the illustrated embodiment, node controller 116a signals system controller 112 that a failure has occurred. For example, node controller 116a may observe a loss of communication with node controller 122a. The primary system controller determines the failure conditions (step 204). As noted in the previous example, system controller 112 determines that a communications failure has occurred between node 104 and node 106 due to the loss of communication between node controller 116a and node controller 122a. In another embodiment, the primary system controller may determine failure conditions without receiving a signal from a node controller that a failure has occurred. For example, the primary system controller may determine a loss of communication with a particular node controller without the node controller sending an alert.

The primary system controller determines whether or not the failure conditions require a simultaneous dump of debug information (decision block 206). A simultaneous dump is when multiple service processors working in parallel provide debug information at the same time. Debug information may include first failure data capture (FFDC) as well as debug dump data, where debug dump data is a superset of FFDC that includes all information from the controller, including information that may not be directly relevant to the specific error investigation. A simultaneous dump of debug information may improve the analysis of errors within a distributed computer system by providing information from different service processors at the same instant that the error occurs. For example, capturing data from a backup node controller and/or system controller at the time of a failure of a primary node controller may provide valuable information regarding the system performance at that time. A simultaneous dump of debug information may be required if, for example, the primary system controller detects that interconnect issues arise between multiple nodes. If the primary system controller determines the failure conditions do not require a simultaneous dump of debug information from multiple service processors, no additional actions are taken (no branch, decision block 206).

If the primary system controller determines that the failure conditions do require a simultaneous dump of debug information (yes branch, decision block 206), then the primary system controller selects the service processors to alert (step 208). For example, in the depicted embodiment, if the interconnect between node 104 and node 106 fails, system controller 112 selects the primary and backup node controllers from each of the two nodes between which an interconnect fail has been detected, specifically, node controller 116a, node controller 116b, node controller 122a and node controller 122b, to alert to the error. In one embodiment, a map is created during system design. The map defines scenarios of one or more possible failure conditions and the service processors selected to be alerted for each of the associated failure conditions, as depicted and described in further detail with respect to FIG. 3.

Subsequent to selecting which service processors to alert, the primary system controller broadcasts an alert to the selected node controllers and the backup system controller (step 210). The alert is a request to generate a dump of debug information. In the example discussed above where a communications failure has been detected between node 104 and node 106, system controller 112 alerts node controller 116a, node controller 116b, node controller 122a, node controller 122b, and system controller 114 that a dump of debug information is required to be generated.

A plurality of techniques is introduced herein by which the primary system controller may broadcast an alert to the selected service processors from which a simultaneous dump of debug information is required. According to one such technique, in one embodiment the service processors from which a simultaneous dump of debug information is required are alerted by utilizing a programmable interrupt generator in server computer 102 that can communicate with the system controllers and all of the node controllers. A programmable interrupt generator is a device that generates interrupts to one or more selected service processors to which it is connected.

For example, if system controller 112 selects node controller 116a and node controller 122a to alert, system controller 112 signals the interrupt generator (not shown) to interrupt node controller 116a and node controller 122a. According to another such technique, in another embodiment the service processors from which a simultaneous dump of debug information is required are alerted by having the primary system controller broadcast the error on the ethernet transport (not shown) on which all of the selected service processors reside. According to a third technique, in another embodiment, where an inter-node error is detected by only one service processor, one of the service processors can inform another service processor through a functional subsystem interface (FSI). The use of the FSI (not shown) may be implemented if, for example, the receiving end of an inter-node bus experiences an error, but the transmission end of the inter-node bus is not affected by the error. An FSI is a one-level interface which provides two way communications.

Responsive to receiving the alert from the primary system controller, the selected node controllers and the backup system controller generate a dump of debug information (step 212). Continuing the example from the illustrated embodiment, node controller 116a, node controller 116b, node controller 122a, node controller 122b, and system controller 114 each generate a dump of debug information.

Once the dumps have been generated, the selected node controllers and the backup system controller transmit the dumps of debug information to the primary system controller (step 214). From the previous example, node controller 116a, node controller 116b, node controller 122a, node controller 122b, and system controller 114 each transmit the associated dump to system controller 112.

Responsive to receiving the dumps of debug information from each of the selected node controllers and the backup system controller, the primary system controller aggregates the various dumps into a single dataset (step 216). The aggregated dataset may be used by a system administrator to analyze the error and determine the root cause and corrective action to take. Continuing the example from the illustrated embodiment, system controller 112 aggregates the data dumps received from node controller 116a, node controller 116b, node controller 122a, node controller 122b, and system controller 114. The aggregated dataset may be stored in memory of the primary system controller, or in the memory of any of the service processors providing that the data is accessible to a system administrator of server computer 102. In this example, the aggregated data set is stored in memory 140 of system controller 112.

Figure 3:
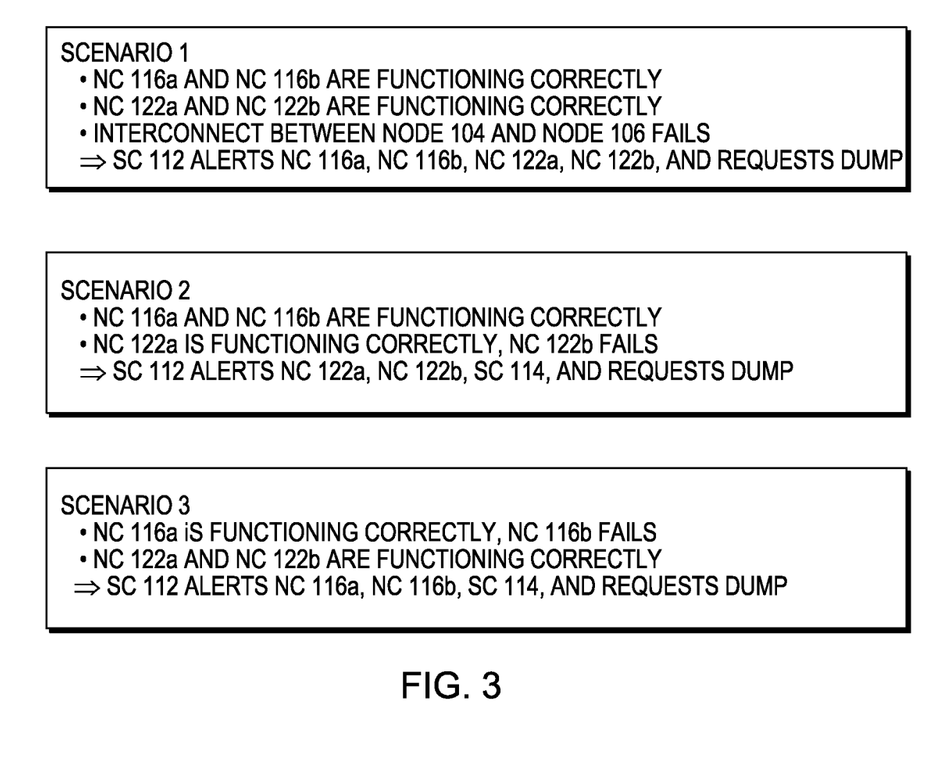
FIG. 3 illustrates examples of scenarios for synchronizing debug information generation according to a predetermined map, in accordance with an embodiment of the present invention.

FIG. 3 illustrates examples of scenarios for synchronizing debug information generation according to a predetermined map, in accordance with an embodiment of the present invention. As mentioned previously with regard to FIG. 2, in one embodiment of the present invention, the primary system controller may determine that failure conditions require a simultaneous dump of debug information from multiple service processors by means of a map created at the time of system design. The map defines scenarios of one or more possible failure conditions and the service processors selected to be alerted for each of the associated failure conditions. In various embodiments, a map, or a collection of scenarios, is stored on one or more service processors. In the depicted embodiment, the primary system controller takes note of service processors that are functioning correctly, as well as service processors that experience an error. Scenario 1 depicts the occurrence of an inter-node failure where there is a loss of communication between node 104 and node 106. In this scenario, the primary system controller, system controller 112, alerts and requests debug information from the primary and backup node controllers of both node 104 and node 106, specifically, node controller 116a, node controller 116b, node controller 122a and node controller 122b. Scenario 2 depicts the occurrence of a failure of a backup node controller, specifically node controller 122b in node 106. In this scenario, the primary system controller, system controller 112, alerts and requests debug information from the node controller that experienced the error, i.e. node controller 122b, as well as the redundant node controller of that node, node controller 122a, and the backup system controller, system controller 114. The backup system controller has an equal view of the system as the primary system controller. A failure experienced in a node controller may be, for example, a communication failure between the primary system controller and the failed node controller. In this case, the backup system controller may have a different view of the failure since the backup system controller did not experience the failure. Therefore the debug information dumped by the backup system controller may assist in the failure analysis. Scenario 3 depicts the occurrence of a failure of a backup node controller, specifically node controller 116b in node 104. In this scenario, the primary system controller, system controller 112, alerts and requests debug information from the node controller that experienced the error, i.e. node controller 116b, as well as the redundant node controller of that node, node controller 116a, and the backup system controller, system controller 114. It should be appreciated that the scenarios depicted in FIG. 3 are examples of the many scenarios that may exist in a complex, distributed computer system, and do not imply any limitations with regard to scenarios for simultaneous debug information generation for server computer 102.

Figure 4:
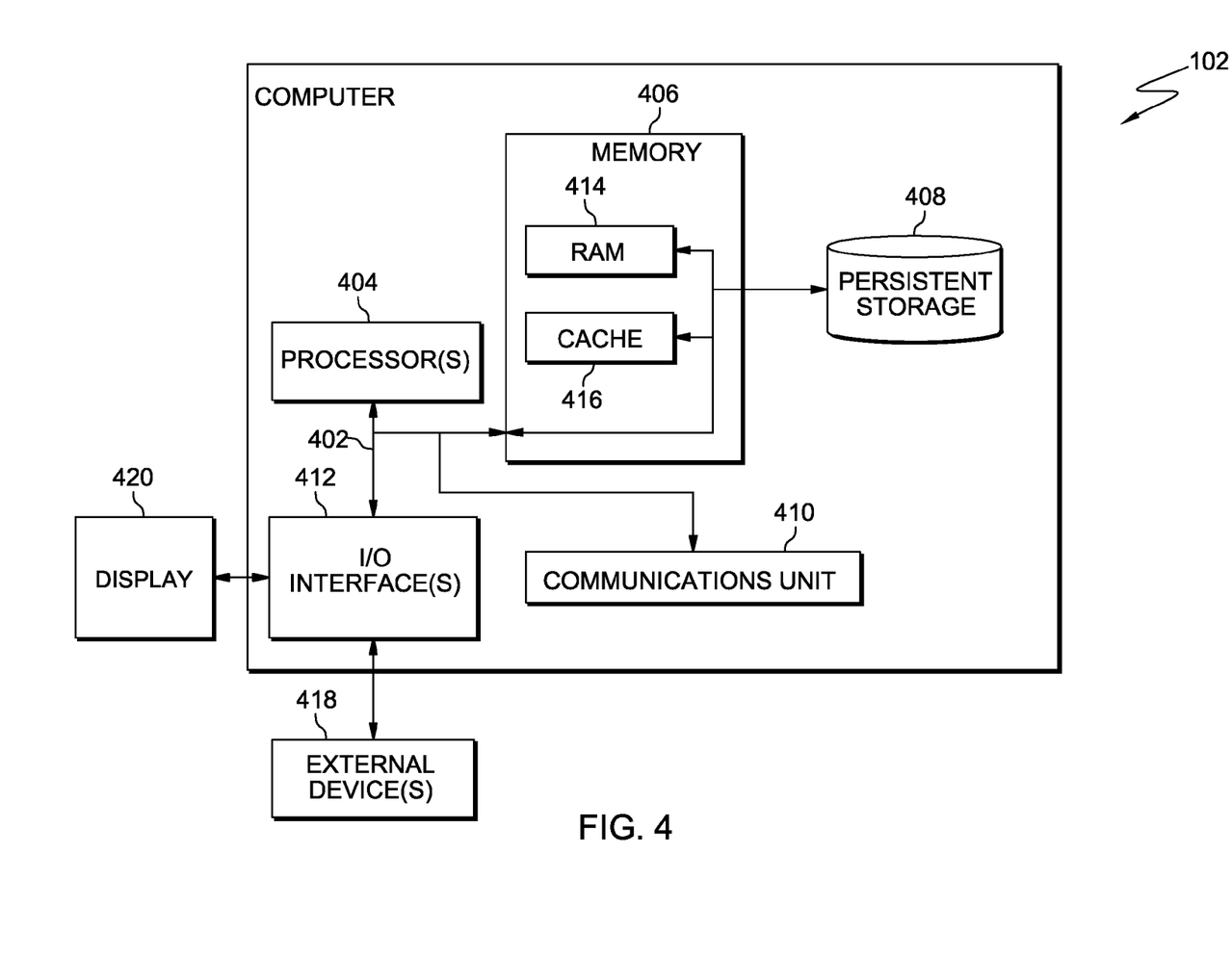
FIG. 4 depicts a block diagram of components of the server computer of FIG. 1, in accordance with an embodiment of the present invention.

FIG. 4 depicts a block diagram of components of server computer 102 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Aggregated debug datasets are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of server computer 102. In these examples, communications unit 410 includes one or more network interface cards. Communications unit 410 may provide communications through the use of either or both physical and wireless communications links. Aggregated debug datasets may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for determining a location of failure between interconnects/controller, the computer program product comprising:
one or more computer-readable storage device and program instructions stored on the one or more computer-readable storage device, the stored program instructions comprising:
program instructions to collect debug information simultaneously at a plurality of nodes coupled to an interconnect; and
program instructions to analyze the debug information collected simultaneously thereby determining which end of the interconnect caused the failure.

2. The computer program product of claim 1, further comprising:
program instructions to determine, by a first system controller coupled to a second system controller and a plurality of node controllers of a server computer, an error in the server computer;
program instructions to determine, by the first system controller, that a simultaneous dump should be performed by a plurality of both the second system controller and the plurality of node controllers, responsive to determining the error in the server computer; and
program instructions to perform, by the plurality of both the second system controller and the plurality of node controllers, the simultaneous dump.

3. The computer program product of claim 2, further comprising program instructions to broadcast, by the first system controller, an alert to the plurality of both the second system controller and the plurality of node controllers, responsive to determining that the simultaneous dump should be performed.

4. The computer program product of claim 3, wherein broadcasting, by the first system controller, an alert to the plurality of both the second system controller and the plurality of node controllers comprises program instructions to utilize a programmable interrupt generator in the server computer to communicate with the plurality of system controllers and the plurality of node controllers.

5. The computer program product of claim 3, wherein broadcasting, by the first system controller, an alert to the plurality of both the second system controller and the plurality of node controllers comprises program instructions to broadcast, by the first system controller, the error on an ethernet transport on which the plurality of both the second system controller and the plurality of node controllers reside.

6. The computer program product of claim 3, wherein broadcasting, by the first system controller, an alert to the plurality of both the second system controller and the plurality of node controllers comprises program instructions to utilize a functional subsystem interface (FSI) in the server computer to communicate with the plurality of system controllers and the plurality of node controllers.

7. The computer program product of claim 2, wherein program instructions to determine, by the first system controller, that a simultaneous dump should be performed by a plurality of both the second system controller and the plurality of node controllers further comprise program instructions to utilize a predetermined map that defines scenarios for which a simultaneous dump is required.

8. A computer system for determining a location of failure between interconnects/controller, the computer system comprising:
one or more computer processors;
one or more computer-readable storage device;
program instructions stored on the computer-readable storage device for execution by at least one of the one or more processors, the program instructions comprising:
program instructions to collect debug information simultaneously at a plurality of nodes coupled to an interconnect; and program instructions to analyze the debug information collected simultaneously thereby determining which end of the interconnect caused the failure.

9. The computer system of claim 8, further comprising:
program instructions to determine, by a first system controller coupled to a second system controller and a plurality of node controllers of a server computer, an error in the server computer;
   program instructions to determine, by the first system controller, that a simultaneous dump should be performed by a plurality of both the second system controller and the plurality of node controllers, responsive to determining the error in the server computer; and
   program instructions to perform, by the plurality of both the second system controller and the plurality of node controllers, the simultaneous dump.

10. The computer system of claim 9, further comprising program instructions to broadcast, by the first system controller, an alert to the plurality of both the second system controller and the plurality of node controllers, responsive to determining that the simultaneous dump should be performed.

11. The computer system of claim 10, wherein broadcasting, by the first system controller, an alert to the plurality of both the second system controller and the plurality of node controllers comprises program instructions to utilize a programmable interrupt generator in the server computer to communicate with the plurality of system controllers and the plurality of node controllers.

12. The computer system of claim 10, wherein broadcasting, by the first system controller, an alert to the plurality of both the second system controller and the plurality of node controllers comprises program instructions to broadcast, by the first system controller, the error on an ethernet transport on which the plurality of both the second system controller and the plurality of node controllers reside.

13. The computer system of claim 9, wherein program instructions to determine, by the first system controller, that a simultaneous dump should be performed by a plurality of both the second system controller and the plurality of node controllers further comprise program instructions to utilize a predetermined map that defines scenarios for which a simultaneous dump is required.

\* \* \* \* \*